(12) United States Patent
Stang et al.

(10) Patent No.: US 12,083,900 B2
(45) Date of Patent: Sep. 10, 2024

(54) CONTROL UNIT CIRCUIT FOR A MOTOR VEHICLE, MOTOR VEHICLE AND OPERATING METHOD FOR THE CONTROL UNIT CIRCUIT

(71) Applicant: Continental Automotive GmbH, Hannover (DE)

(72) Inventors: Udo Stang, Regensburg (DE); Herbert Schmittschmitt, Scheßlitz (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/768,569

(22) PCT Filed: Oct. 7, 2020

(86) PCT No.: PCT/EP2020/078073
§ 371 (c)(1),
(2) Date: Apr. 13, 2022

(87) PCT Pub. No.: WO2021/073965
PCT Pub. Date: Apr. 22, 2021

(65) Prior Publication Data
US 2024/0100956 A1    Mar. 28, 2024

(30) Foreign Application Priority Data
Oct. 14, 2019   (DE) .................... 10 2019 215 790.4

(51) Int. Cl.
*B60L 3/04*     (2006.01)
*B60L 3/00*     (2019.01)
(Continued)

(52) U.S. Cl.
CPC .............. *B60L 3/04* (2013.01); *B60L 3/0046* (2013.01); *B60L 53/14* (2019.02); *H02J 7/0013* (2013.01); *B60L 2240/547* (2013.01)

(58) Field of Classification Search
CPC ........................................................ B60L 3/04
(Continued)

(56) References Cited

U.S. PATENT DOCUMENTS 5,487,956 A * 1/1996 Bromley ............... H02J 7/1423
429/90
5,497,641 A   3/1996 Linde et al.
(Continued)

FOREIGN PATENT DOCUMENTS

DE    19633202 C1    9/1997
DE    10002537 A1    7/2001
(Continued)

OTHER PUBLICATIONS

Office Action dated Jul. 8, 2020 from corresponding German patent application No. 10 2019 215 790.4.
(Continued)

*Primary Examiner* — Jerry D Robbins

(57) ABSTRACT

Disclosed is a control unit circuit for a motor vehicle. The control unit circuit comprises a control unit and, outside a housing of the control unit, an electrical energy store for an emergency supply. To form an electrical circuit for the emergency supply, two electrical poles of the energy store are connected to the control unit via a cable and one of the two electrical poles is connected via a switching element to a ground potential of the on-board electrical system and at least one measurement circuit couples each one of the poles to the ground potential and is set up to generate a measurement signal, which is correlated with a voltage. If the respective measurement signal signals that the respective voltage is greater than a predetermined threshold value, the switching element is switched to an electrically non-conductive state.

15 Claims, 3 Drawing Sheets

(51) Int. Cl.
*B60L 53/14* (2019.01)
*H02J 7/00* (2006.01)

(58) Field of Classification Search
USPC .......................................................... 320/109
See application file for complete search history.

(56) References Cited

U.S. PATENT DOCUMENTS

| | | | |
|---|---|---|---|
| 6,056,076 A | 5/2000 | Bartel et al. | |
| 7,791,218 B2* | 9/2010 | Mekky | E05B 81/86 |
| | | | 307/64 |
| 2002/0130643 A1 | 9/2002 | Binder et al. | |
| 2014/0288781 A1* | 9/2014 | Horiguchi | B60R 21/01 |
| | | | 701/45 |
| 2015/0175002 A1* | 6/2015 | Lee | B60L 3/12 |
| | | | 701/36 |
| 2017/0179760 A1* | 6/2017 | Jawany | H02J 9/061 |
| 2018/0086207 A1* | 3/2018 | Mito | B60L 3/04 |
| 2018/0108961 A1* | 4/2018 | Papp | H01P 1/15 |
| 2019/0009740 A1* | 1/2019 | Macks | B60L 3/0084 |
| 2019/0085600 A1* | 3/2019 | Leonardi | E05F 15/43 |
| 2019/0092257 A1* | 3/2019 | Boecker | H02J 9/061 |
| 2022/0195761 A1* | 6/2022 | Trescases | H01M 10/0525 |

FOREIGN PATENT DOCUMENTS

| | | |
|---|---|---|
| DE | 10020305 A1 | 10/2001 |
| DE | 10113081 C1 | 4/2002 |
| DE | 102009053653 A1 | 5/2011 |
| EP | 0584499 A1 | 3/1994 |
| EP | 3349326 A1 | 7/2018 |

OTHER PUBLICATIONS

International Search Report and Written Opinion dated Jan. 18, 2021 from corresponding International patent application No. PCT/EP2020/078073.

* cited by examiner

CONTROL UNIT CIRCUIT FOR A MOTOR VEHICLE, MOTOR VEHICLE AND OPERATING METHOD FOR THE CONTROL UNIT CIRCUIT

The invention relates to an electrical circuit in which a control unit and an electrical energy store are interconnected for an emergency supply of the control unit. This circuit is referred to here as the control unit circuit. The invention also includes a motor vehicle that is equipped with the control unit circuit and a method for operating the control unit circuit.

In order to keep a control unit in a motor vehicle operational even after an accident (crash) even in the event that the on-board electrical system of the motor vehicle fails, an additional energy supply can be provided by way of an electrical energy store. An example of such a control unit is what is known as the e-call module for making an emergency call after a crash. Such an e-call service is supplied without interruption by way of a backup battery if the connection to the positive line of the on-board electrical system (the so-called terminal 30 line, KL30) is interrupted. A suitable backup battery can be implemented by way of a lithium-ion battery.

For reasons of space, provision may be made here for the backup battery or generally the electrical energy store to be arranged outside of the control unit and to be connected thereto via a cable. As a result, however, there is now the possibility that if the cable is damaged, one of its supply lines or wires will make electrical contact with the on-board electrical system, that is to say will be short-circuited with the positive line or the ground potential of the on-board electrical system. While the on-board electrical system usually has a voltage with a rated value of 12 volts, said electrical energy store for the emergency supply of the control unit is operated with a rated voltage of less than 12 volts, for example 4 volts. In this case, the negative pole of the electrical energy store is kept electrically connected to the ground potential of the motor vehicle in order to prevent the potential of the two circuits from drifting apart. If, for example, the cable of the electrical energy store is damaged and its positive pole touches the positive line of the on-board electrical system, then the on-board electrical system voltage, that is to say for example 12 volts, is also applied to the electrical energy store, which can damage the electrical energy store due to overvoltage or due to an excessive charging current, for example due to overheating and/or degassing. In general, however, the reaction is unpredictable. Then the operation of the control unit would no longer be guaranteed after a crash.

A control unit circuit comprising a control unit and an electrical energy store for emergency supply provided for this purpose is known, for example, from DE 196 33 202 C1. An emergency operation circuit switches the control unit over from the on-board electrical system of the motor vehicle to the energy store in the event of undervoltage.

The object of the invention is to prevent the operation of the control unit in a control unit circuit having a control unit and associated emergency supply connected via a cable even in the event that an electrical connection between a pole of the energy store of the emergency supply and a live element of the on-board electrical system of the motor vehicle damages the energy store due to an overvoltage and/or an excessive charging current.

The object is achieved by the subject matter of the independent patent claims. Advantageous embodiments of the invention are described by the dependent patent claims, the description that follows and the figures.

The invention provides said control unit circuit for a motor vehicle. "Control unit circuit" is used in this case to mean said combination of a control unit for providing a vehicle function and an electrical energy store arranged outside a housing of the control unit for an emergency supply of the control unit. An example of the vehicle function that can be provided by the control unit is the e-call function that has already been described. The electrical energy store may be an electrical or electrochemical accumulator, for example a lithium-ion battery. The energy store differs from the energy store of the on-board electrical system of the motor vehicle and can provide in particular a rated voltage that is lower than the rated voltage of the on-board electrical system, in particular lower than half the rated voltage of the on-board electrical system. The invention is based on the assumption that the energy store for the emergency supply is set up to supply the control unit with electrical energy if there is no supply current from the on-board electrical system of the motor vehicle. Switching over from the supply current of the on-board electrical system to the electrical energy store can take place in a manner known from the prior art.

In order to be able to install the energy store in the motor vehicle at a distance from the control unit, the two poles of the energy store (positive pole and negative pole) are connected to the control unit via a cable. The cable can provide a supply line or wire to each pole for the electrical connection. Each supply line can be realized by a strand or a Litz wire.

In order to avoid a potential drift between the circuit of the emergency supply (with the electrical energy store) on the one hand and the on-board electrical system of the motor vehicle on the other hand, provision is made for one of the two electrical poles to be connected to a ground potential of the on-board electrical system via a switching element. It is preferably the negative pole. In this case, the switching element can be provided in the control unit or in the energy store or on the cable. This is because it may be sufficient if one pole of the energy store is "indirectly" connected to the ground potential in the control unit via the cable. Another designation for said ground potential of the on-board electrical system is "vehicle ground", which can be provided, for example, in a vehicle panel or vehicle support or the chassis. The ground potential is generally provided in a motor vehicle by way of its structural components. Since there is an electrical connection to the two poles of the energy store both in the control unit and in the cable as well as on the energy store itself, said switching element can be arranged at one of these locations. By way of example, a semiconductor switch, for example a transistor, can be provided as the switching element.

In the control unit circuit according to the invention, at least one measurement circuit is provided, which couples each one of the poles of the energy store (positive pole or negative pole) to the ground potential and is set up to generate a measurement signal, which is correlated with or dependent on a voltage dropped between the respective pole of the energy store and the ground potential. Such a measurement circuit can therefore be used to measure which voltage is present between the respective pole and the ground potential or, if only a threshold value comparison is implemented, whether the voltage is greater or lower than a predetermined threshold value. The measurement signal therefore only needs to be correlated with the voltage to the extent that the measurement signal indicates whether the voltage is greater or lower than the threshold value. However, the measurement signal can also match the voltage or represent a scaled variant of the voltage, as can be achieved, for example, by means of a voltage divider. Like the switching element, the measurement circuit can be connected to the pole in the control unit, on the cable or directly on the energy store.

A control circuit of the switching element (which connects one pole of the energy store to the ground potential of the on-board electrical system) is set up to keep the switching element in an electrically conductive state in normal operation of the control unit (when the supply current is available from the on-board electrical system) and, at least in the event that the respective measurement signal of the at least one measurement circuit indicates that the respective voltage (between the pole monitored by said measurement circuit and the ground potential) is greater than a predetermined threshold value, to switch the switching element to an electrically non-conductive state and thus to suppress or to interrupt the coupling, brought about by the electrical switching element, between the cable and ground potential. Thus, the potentials of this previously coupled pole and the ground potential are now decoupled or separated.

If there is now a short circuit between the on-board electrical system and one pole of the energy store, for example because the contact pins on a plug of the cable in question are bent and touching or the insulation of the cable is chafed, this pole is drawn to the potential of the on-board electrical system line, in the case of the positive line of the on-board electrical system, for example, to 12 volts or generally to the on-board electrical system voltage. In general, it is necessary to protect the energy store against fault currents that could overload the energy store and cause the undesired reaction described. However, the measurement circuit of this pole can then recognize that the voltage between this pole and the ground potential of the on-board electrical system changes. If the voltage exceeds said threshold value, the other electrical coupling between the ground potential and the cable, as is caused specifically by the switching element, is interrupted or suppressed. This leaves only one location of the short circuit as the only electrical connection between the circuit of the emergency supply on the one hand and the on-board electrical system on the other. The circuit is then raised to the potential of the on-board electrical system without a current being able to flow here because the second electrical coupling via the switching element is interrupted. However, this allows the circuit of the emergency supply to continue to operate, even if, for example, a faulty plug or damaged electrical insulation of the cable causes electrical contact between one pole of the energy store and the positive line of the on-board electrical system.

The invention also encompasses embodiments that afford additional advantages.

In one embodiment, the control circuit has a signal input for receiving a switching signal and is set up to switch the switching element to an electrically non-conductive state depending on the switching signal. In addition to the at least one measurement circuit, the signal input can also be used to cause the control circuit to switch the switching element to an electrically non-conductive state. Thus, for example, a microcontroller can be used to control the coupling between the cable and the ground potential brought about by the switching element. The signal input can be realized as an electrical contact or pin.

In one embodiment, it is provided in this connection that the control unit is set up to carry out a test routine for checking an insulation resistance of the cable and, at the beginning of the test routine, to generate the switching signal at the control input of the control circuit. The test routine can thus be carried out in the case of an interrupted electrical coupling between the cable and the ground potential. This results in the advantage that the test routine can include detecting a ground fault current. This can only be detected when the electrical coupling, as is brought about by the switching element, is suppressed. If a current nevertheless flows, for example via faulty insulation, this can be detected as a fault current, since there is a difference in the current strengths between the supply lines of the cable. By measuring the current strength in both supply lines of the cable, at the poles of the energy store, faulty insulation or an insulation resistance of the cable can thus be detected if the difference in current strengths is greater than a threshold value. Via the signal input, the control unit now has control over the electrical coupling for the test routine, as is brought about by the switching element. In addition or as an alternative, a load test can be carried out on the energy store, in which a predetermined load resistance is connected to the energy store in order to generate a current flow.

In one embodiment, during the load test, said electric current of the energy store is routed via the load resistor connected between the poles of the energy store and in the process the switching element is kept in the electrically non-conductive state by means of the switching signal and a respective voltage of both poles of the energy store (14) with respect to the ground potential of the cable is set to a positive value by virtue of one of the poles or one of the supply lines being connected to a charging circuit of the control unit circuit. It is then advantageously possible to also measure the voltage between the poles with a voltage measurement input of a microcontroller that can only measure positive voltage (for example using an analog-to-digital converter). The microcontroller can in this case use the ground potential as ground.

In one embodiment, the respective measurement circuit comprises in each case a series circuit composed of a Zener diode and a resistance element. The respective pole is connected to the ground potential via said series circuit. Current only flows through this series connection if the breakdown voltage of the Zener diode is exceeded. The breakdown voltage of the Zener diode thus stipulates said threshold value, which must be exceeded by the voltage between the pole and the ground potential, in order for the control circuit to switch the switching element to the electrically non-conductive state. The described series circuit composed of the Zener diode and the resistance element has proven to be particularly advantageous with regard to the response time when switching the switching element.

In one embodiment, the Zener diode is arranged on the pole side (that is to say toward the side of the pole of the electrical energy store) and the resistance element is arranged on the ground potential side (that is to say toward the ground potential) in the series circuit. The electrical connection point between the Zener diode and the resistance element therefore has the ground potential when the voltage between the pole and the ground potential is lower than the threshold value. If the Zener diode then breaks down because the voltage is greater than the threshold value, the voltage at the connection point also increases. A tap at the connection point can thus be used to generate a switching signal.

In one embodiment, each measurement circuit between the respective pole (to which it is connected) and the ground potential has a resistance value of more than 1 kiloohm, in particular more than 5 kiloohms. This results in the advantage that the measurement circuit itself causes only a small measurement current between the circuit for the emergency supply and the on-board electrical system.

In one embodiment, said switching element is an N-channel MOSFET, the source electrode of which is connected to the ground potential. The control circuit that controls said switching element provides a connection of a gate electrode of the N-channel MOSFET to a positive voltage of the control unit via a pull-up resistor. The positive voltage of the energy store can also be routed to the gate electrode via a pull-up resistor. By way of this circuit arrangement, the switching element switches to the electrically conductive state when the positive voltage is present. This means that no active switching process is necessary. In order to now allow rapid turn-off, that is to say to switch the switching element to the electrically non-conductive state, the respective measurement circuit is connected to a control input of a respective switching transistor, which connects the gate electrode to the ground potential. So while the gate electrode is connected to a positive voltage via a pull-up resistor, there is another interconnection of the gate electrode to the ground potential. However, this interconnection is switched to the electrically non-conductive state by the switching transistor. The measurement circuit can generate its measurement signal at the control input of this switching transistor (that is to say its gate or base), with the result that the measurement circuit can directly switch the switching transistor to the electrically conductive state. By way of example, an MPN bipolar transistor can be used as switching transistor. If the switching transistor is switched to the electrically conductive state, then the potential of the gate electrode is decreased to the ground potential, as a result of which the switching element is switched to the electrically non-conductive state. Thus, each measurement circuit can directly switch the switching element to the electrically non-conductive state via its own switching transistor.

In one embodiment, at least one further switching transistor connects the described gate electrode to the ground potential. Thus, independently of the measurement circuits, the switching element can also be switched to the electrically non-conductive state via the respective further switching transistor. For example, said signal input, via which a microcontroller should be able to control the switching element, can be connected to the control input of such a further switching transistor. If the switching signal is generated at the signal input, the further switching transistor can thus be switched to the electrically conductive state and the switching element can thus be switched to the electrically non-conductive state.

As already described, one measurement circuit can be provided for each pole (positive pole and negative pole) of the electrical energy store. This means that the positive pole can be connected to the ground potential via a measurement circuit and/or the negative pole can be connected to the ground potential via a measurement circuit. In one embodiment, a measurement circuit is provided for each of the two poles. The measurement circuit, which is connected to the same pole that is also connected to the ground potential via the switching element, cannot actually build up a voltage that could exceed the threshold value, since the switching element provides an electrical coupling to the ground potential. However, if there is a short circuit with a positive line of the on-board electrical system, the current then flowing via this pole and the switching element can become so large that the voltage dropping across the switching element exceeds the threshold value. This can then be detected using the measurement circuit and the switching element can also be switched to the electrically non-conductive state.

If two measurement circuits are provided, one per pole, one embodiment provides that the measurement circuits provide different resistance values between the respective pole and the ground potential. Since each pole has a different potential (since the two poles are offset from each other by the electrical supply voltage of the energy store via the electrical energy store), the different resistance values of the ground potentials can ensure that the resulting measurement signals are at the same level. Regardless of the pole to which the respective measurement circuit is connected, no separate adjustment is necessary in the control circuit for the switching element in order to be able to process the respective measurement signal of the measurement circuits.

The cable, which connects the electrical energy store to the control unit, can have supply lines (wires) in the known manner, each of which connects one pole of the energy store to the control unit. Each pole is therefore connected to the control unit via its own supply line of the cable. In one embodiment, the cable additionally provides a respective measurement line for one or both of the poles for connecting the pole to the control unit while bypassing the supply lines. The cable thus has three or more than three lines. Two of these lines are supply lines, via which the actual load current or the electrical power for supplying the control unit is transmitted. One or more than one measurement line then remains, and the control unit is set up to detect a voltage of the respective pole to which the measurement line is routed and/or a thermistor that can be provided on the energy store for temperature measurement via the at least one measurement line. This ensures that a current flow through the supply lines and the associated voltage drop across the supply lines do not distort the measurement result at the pole.

As already stated, a control unit with an emergency supply is expedient in particular when an e-call emergency call function is provided as the vehicle function by the control unit. This is therefore explicitly provided as a vehicle function in one embodiment of the invention.

The invention also includes a motor vehicle in which an embodiment of the control unit circuit described is provided. In the motor vehicle, the control unit circuit can thus be operated in an advantageous manner even if there is an electrical short circuit between one pole of the electrical energy store of the control unit circuit and the on-board electrical system of the motor vehicle, that is to say an electrical connection is created between them (for example due to a plug fault or a faulty insulation). If said measurement circuit for monitoring the voltage between the pole and the ground potential of the motor vehicle is provided at this pole or for this pole, the switching element can be switched to the electrically non-conductive state if the short circuit occurs. Then the circuit for the emergency supply can continue to be operated.

The operation of the control unit circuit according to the invention results in a method that is also part of the invention. In the method for operating a control unit circuit, a control unit is provided for providing a vehicle function and, outside a housing of the control unit, an electrical energy store for an emergency supply of the control unit, wherein the energy store supplies the control unit with electrical energy if there is no supply current from an on-board electrical system of the motor vehicle, wherein two electrical poles of the energy store are connected to the control unit via a cable and one of the two electrical poles is connected via a switching element to a ground potential of the on-board electrical system and at least one measurement circuit couples each one of the poles to the ground potential and generates a measurement signal, which is correlated with a voltage dropped between the respective pole and the ground potential, and a control circuit of the switching element keeps the switching element in an electrically conductive state in normal operation of the control unit and, at least in the event that the respective measurement signal of the at least one measurement circuit indicates that the respective voltage is greater than a predetermined threshold value, switches the switching element to an electrically non-conductive state and thus interrupts an electrical coupling to the ground potential.

The invention also includes embodiments of the method according to the invention having features that have already been described in connection with the developments of the control unit circuit according to the invention. For this reason, the corresponding embodiments of the method according to the invention are not described here again.

The invention also comprises the combinations of the features of the described embodiments.

Exemplary embodiments of the invention are described below. In this respect:

The exemplary embodiment explained below is a preferred embodiment of the invention. In the exemplary embodiment, the described components of the embodiment each represent individual features of the invention that should be considered independently of one another and that each also develop the invention independently of one another and can therefore also be considered to be part of the invention individually or in a combination other than that shown. Furthermore, the embodiment described can also be supplemented by further features of the invention that have already been described.

In the figures, elements with the same function are each provided with the same reference signs.

Figure 1:
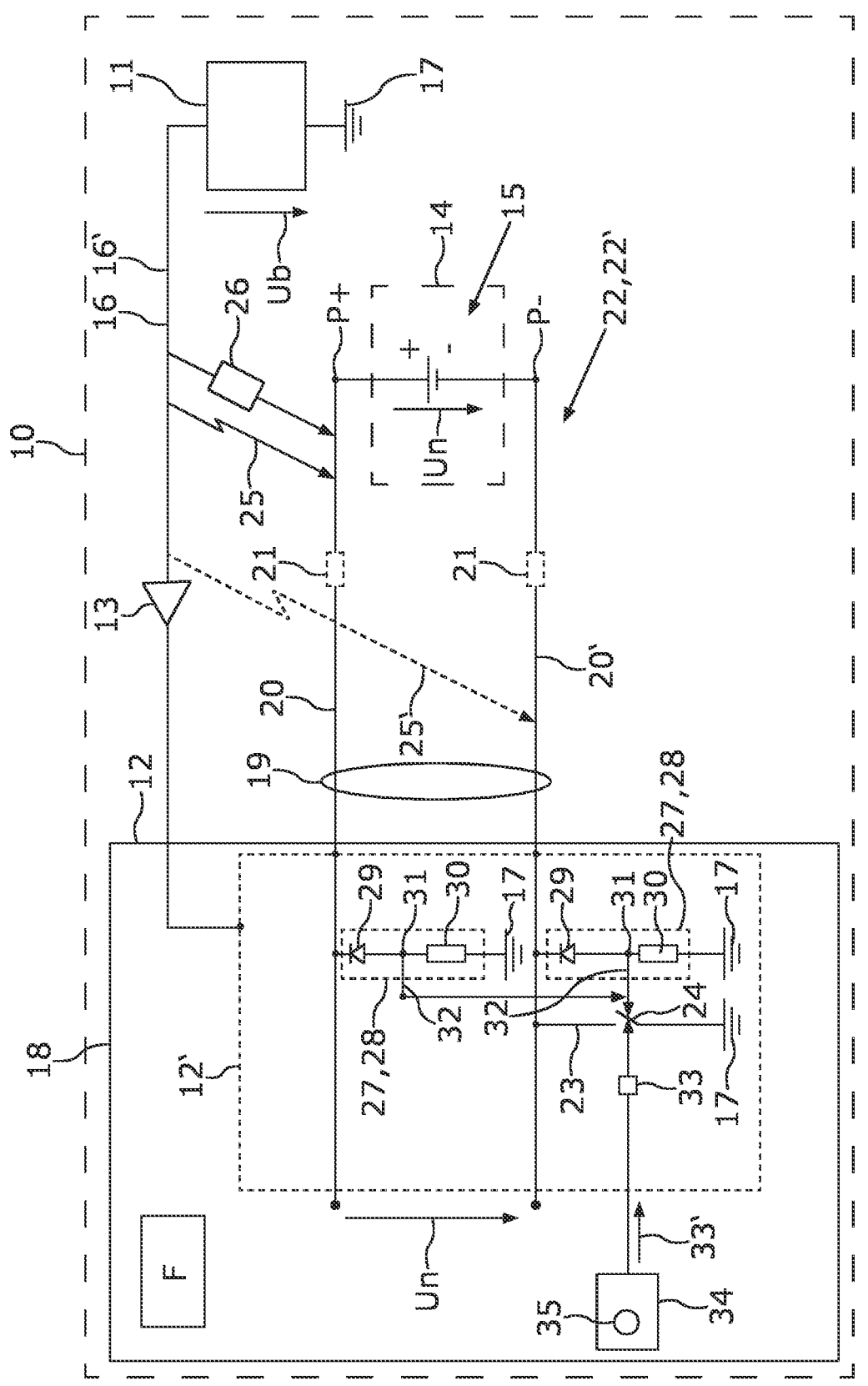
FIG. 1 shows a schematic illustration of one embodiment of the control unit circuit according to the invention.

FIG. 1 shows a motor vehicle 10, which may be an automobile, in particular a passenger vehicle or a truck. An on-board electrical system 11 to which a control unit 12 can be connected can be provided in the motor vehicle 10. The control unit 12 may be an e-call control unit, for example. In the event that a supply current 13 from the on-board electrical system 11 fails, the control unit 12 can be provided with an additional electrical energy store 14, which can have a lithium-ion battery 15, for example. The energy store 14 enables an emergency supply of the control unit 12 and thus represents a backup battery (BUB).

In FIG. 1, the circuit 16 formed by the on-board electrical system 11 is represented by a positive line 16' and a ground potential 17. The ground potential 17 can be provided, for example, in a manner known per se by the supporting metallic structure of the motor vehicle 10. The energy store 14 for the emergency supply of the control unit 12 can be connected to the control unit 12 in that the energy store 14 on the one hand is arranged outside a housing 18 of the control unit 12 and is connected to the control unit 12 via a cable 19. Supply lines 20, 20' are provided by the cable 19, it being possible, for example, for the supply line 20 to represent a positive line and the supply line 20' to represent a negative line. In FIG. 1, the respective resistance value of the line resistance 21 of the supply lines 20, 20' is represented symbolically by a resistance element. The energy store 14 can provide an electrical potential at electrical poles P+, P−, which results in an emergency supply voltage Un between the poles P+, P− as a potential difference. The energy store 14 provides the two poles P+, P− between which the electrical emergency supply voltage Un is generated by the energy store 14. The control unit 12 is connected to these poles P+, P− via the cable 19 so that the emergency supply voltage Un is available in the housing 18 of the control unit 12.

The control unit 12, the energy store 14 and the cable 19 thus overall form a circuit 22, via which the control unit 12 can still be supplied with electrical energy from the energy store 14 even if there is no supply current 13 and can therefore continue to be operated. This may be relevant in the case of an e-call emergency call function, for example after the motor vehicle 10 has crashed. The circuit 22 as a whole represents a control unit circuit 22'.

For normal operation, the on-board electrical system 11 can provide an on-board electrical system voltage Ub. The on-board electrical system voltage Ub can be greater than the emergency supply voltage Un. For example, the on-board electrical system voltage Ub can have a rated voltage value of 12 volts and the emergency supply voltage Un can have a rated value of less than 6 volts, for example 4 volts.

For potential matching between the ground potential 17 of the on-board electrical system 11 and the supply line 20' (negative line), an electrical coupling 23 can be provided, via which the supply line 20' can be connected to the ground potential 17 in order to match the ground potential 17 and the potential of the supply line 20'. The electrical coupling 23 can be designed to be switchable by being routed via a switching element 24, which may be a transistor, for example, in particular a semiconductor power switch, such as for example a MOSFET, such as an N-channel MOSFET, for example.

Protection for the circuit 22 can be provided by means of the switching element 24 in order to avoid an overvoltage and/or a charging current at the energy store if there is an electrical connection or an electrical short circuit 25 between the positive line 16 and one of the poles P+, P−.

Such an electrical connection or a short circuit 25' can also exist between the positive line 16' and the negative supply line 20'. Such a short circuit 25, 25' can be caused, for example, by damage to the insulation of the cable 19 and/or by a fault in a plug of the cable 19. As an alternative to a short circuit 25, 25', there can also be a creepage current via a leakage resistor 26 between the positive line 16' and one of the supply lines 20, 20', which also causes an electrical connection of the circuit 22 to the positive line 16'.

If the short circuit 25 or the creepage current of the leakage resistor 26 occurs, the on-board electrical system voltage Ub drops via this electrical connection and the coupling 23 via the energy store 14, which is therefore subjected to a higher voltage than is provided according to the emergency supply voltage Un. This can lead to damage to the energy store 14. If the short circuit 25' occurs, then the on-board electrical system voltage Ub drops across the switching element 24 and the on-board electrical system 11 is short-circuited except for the resistance of the switching element 24 and the line resistance 21.

In order to take these fault cases into account, provision can be made in the motor vehicle 10 for at least one of the poles P+, P− or both of the poles P+, P− to be connected in each case to the ground potential 17 via a measurement circuit 27. In this case, the measurement circuit 27 can be provided directly at the respective pole P+, P− or in the cable 19 or, as illustrated in FIG. 1, in the control unit 12. This variant is possible because the line resistances 21 are sufficiently low.

The measurement circuit 27 can be designed, for example, as a series circuit 28 in which a Zener diode 29 and a resistance element 30 are connected in series between the respective pole P+, P− and the ground potential 17. A measurement signal 32 can be tapped off at a connection point 31, which signal indicates whether the respective voltage between the pole P+, P− on the one hand and the ground potential 17 on the other hand is greater than a breakdown voltage of the Zener diode 29. If this is the case, there is a switching process at the switching element 24. In normal operation, when said measured voltage is lower than the breakdown voltage of the Zener diode 29, the switching element 24 is switched here to the electrically conductive state, with the result that the coupling 23 exists. If the voltage exceeds the breakdown voltage of the respective Zener diode 29, then the switching element 24 is switched to the electrically non-conductive state, as a result of which the coupling 23 is suppressed or interrupted. Even in the event of a single short circuit 25, 25' or the creepage current, the energy store 14 can still be used by the control unit 12 for further operation or an emergency supply. Thus, such an individual fault relating to a short circuit 25 or 25' or creepage current is thus compensated.

In FIG. 1, the switching logic described is represented only symbolically by a control circuit 12'. The control circuit 12' can additionally provide a signal input 33, through which the switching element 24 can also be switched, for example by a microcontroller 34 using a switching signal 33', which can be provided for carrying out an insulation test or generally a test routine 35. Thus, the provision of the switching element 24 does not prevent a self-test in the control unit 12.

Figure 2:
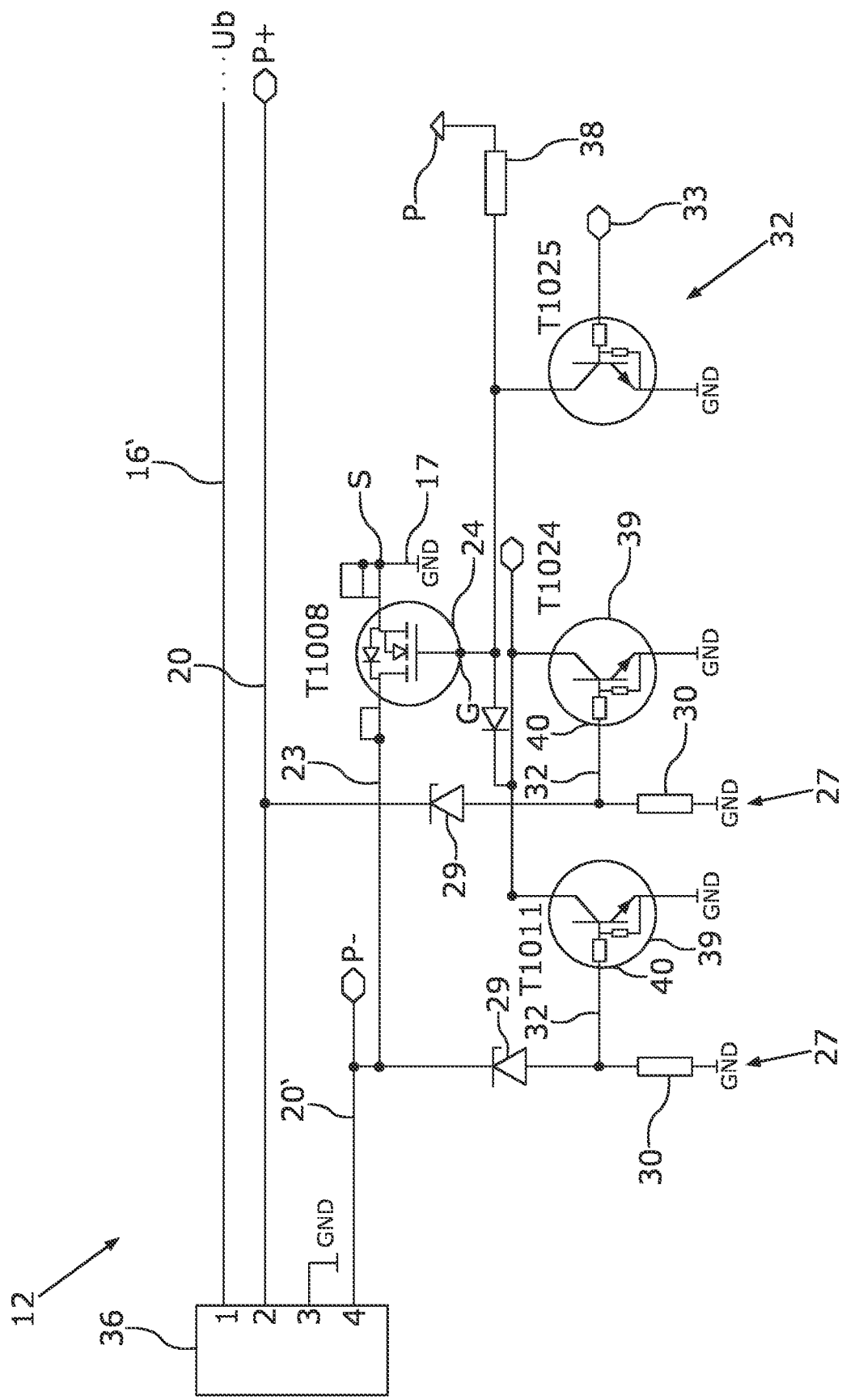
FIG. 2 shows a schematic circuit diagram for implementing the control unit circuit according to the invention.
Figure 3:
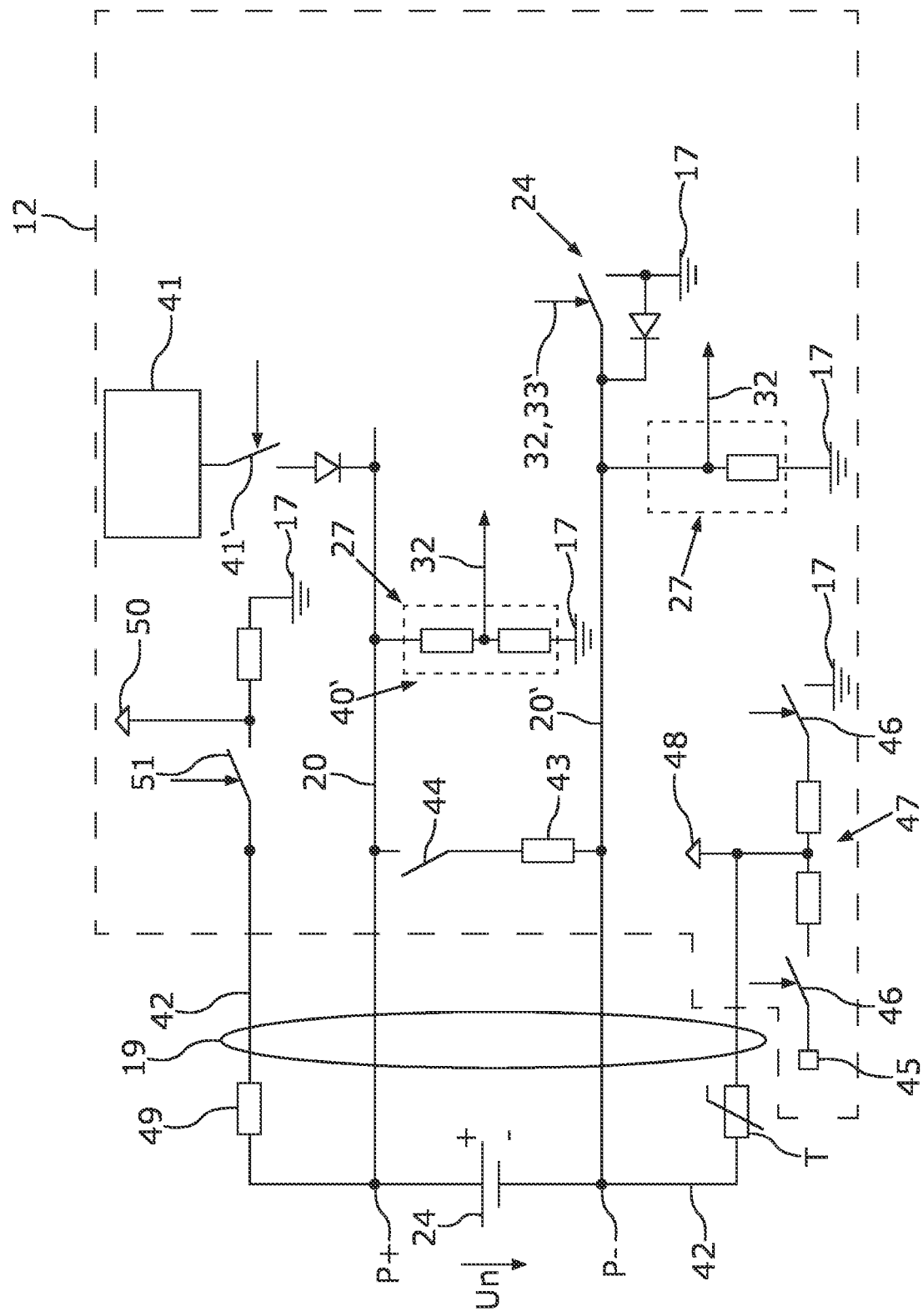
FIG. 3 shows a schematic circuit diagram of an alternative configuration of the control unit circuit according to the invention.

FIG. 2 and FIG. 3 show possible implementations of the control circuit 12'.

According to FIG. 2, the switching element 24 is a power semiconductor switch in the form of a MOSFET, the source electrode S of which is connected to the ground potential 17 and the gate electrode D of which is connected to a positive voltage P, which may be the on-board electrical system voltage Ub, for example. The control unit 12 can be used to receive the on-board electrical system voltage Ub, the voltage of the pole P+, the ground potential 17 (represented as ground GND) and the potential of the pole P− at input terminals. In this context, a plug 36 for the cable 19 of the control unit 12 is shown in FIG. 2. Electrical contact pins or pins 1, 2, 3, 4 with the following assignment can be provided in the plug 32:

1 terminal 30 (positive line of on-board electrical system 11),
3 GND vehicle ground (ground potential 17),
2 pole P+ of the energy store,
4 pole P− of the energy store.

According to the control circuit 12', a potential of the gate G is drawn to the positive voltage P via a pull-up resistor 38, with the result that the switching element 24 is kept in the electrically conductive state. The control circuit can provide a switching transistor 39 for each supply line 20, 20', which transistors are distinguished here by the designations T1011 and T1024. Each switching transistor 39 can receive one of the measurement signals 32 from the measurement circuits 27 via a control input 40, with the result that the switching transistors 39 can be switched to the electrically conductive state depending on the respective measurement signal 32. If the voltage between one of the supply lines 20, 20' now exceeds the threshold value specified by the respective Zener diode 29, the associated switching transistor 39 is switched to the electrically conductive state and the potential of the gate electrode G of the switching element 24 is thus drawn to the ground potential 17, as a result of which the switching element 24 is switched to the electrically non-conductive state. This solution is so quick to switch that if a short circuit 25, 25' or a leakage current (creepage current) occurs, the electrical coupling 23 is interrupted before damage can occur to the energy store 14, the cable 19 or the control unit 12.

FIG. 3 illustrates how a measurement circuit 27 can also be realized as a voltage divider 40'. FIG. 3 also illustrates that the measurement circuits 27 can have different resistance values overall, so that a level of the measurement signals 32 can be kept the same despite different potentials of the poles P+, P−. FIG. 3 shows how one and several resistance elements can be used for this purpose. It also shows how a charging circuit 41 can be switched on via a switch 41' in order to recharge the energy store 14 with electrical energy.

In addition to the supply lines 20, 20', the cable 19 can have at least one measurement line 42, via which a voltage measurement can be provided at the respective pole P+, P− from the control unit 12, with a current strength in the measurement lines 42 being able to be kept lower than in the supply lines 20, 20'. In this way, for example, a load test or stress test can be carried out via a load resistor 43 and a switch 44 on the energy store 14 and, during this, the emergency supply voltage Un provided by the energy store 14 can be measured and the measurement lines 42 can be used for this purpose.

A voltage drop across a thermistor T, which can be mechanically connected to the energy store 14, can also be measured via a measurement line 42 in order thereby to be able to detect a temperature of the energy store. For this purpose, a test voltage can be generated by a circuit for a voltage source 45 (as is known per se), which test voltage can be switched on with the aid of switching elements 46 of switchable voltage dividers 47 so that a temperature signal 48 results when the resistance values are known.

The type of energy store 14 currently installed in the motor vehicle 10 can be indicated by means of a coding resistor 49, which is generated by applying a test voltage 50, which can be realized using a circuit known per se for a voltage source and which can be switched on by means of a switching element 51 on the coding resistor 49, read out or checked.

Aspects of the invention are summarized again below in a particularly preferred embodiment.

The negative connection (or both connections) of the backup battery (energy store 14) to the control unit 12 is separated from the unit ground by a switch (switching element 24, in particular FET) if a positive overvoltage (KL3O) or excessive leakage current (via contact resistances to KL30) is fed in on the positive or negative backup battery feed line or supply line 20, 20'. The ground line can also be disconnected by software using a switching signal 33' (BAT-F_OFF) in order to enable cyclic monitoring of a ground fault current.

This provides backup battery protection against overvoltage and leakage currents on both supply lines. No additional electronics are required in the backup battery module. A high backup battery measurement accuracy through 3 or 4-wire technology for backup battery voltage measurement by equalizing the line resistance is also possible. This represents a more cost-effective solution compared to "intelligent backup batteries".

This can be used in automotive electronics for an uninterrupted power supply, for example in a rechargeable solar battery.

In the circuit diagram of FIG. 2, the backup battery protection electronics are connected to the backup battery P+ and P− pole via BATT_P (Pin2) and BATT_N (Pin4). The gate switching voltage is generated by Ub (+10V) from the control unit voltage supply. FET T1008 switches BATT_N to GND, fault voltage at BATT_N>5V or BATT_P>7V switches the collector of the transistors T1011 or T1024 to GND and thus the gate voltage of T1008 to OV. The FET T1008 opens and the ground connection of the backup battery is broken.

FIG. 3 shows a backup battery protection circuit with temperature measurement and code check. The protective circuit allows GND disconnection via software (BATT_N_OFF at signal input 33). This also enables more complex measurements of the backup battery (health test/load test, charging voltage) 3-wire or 4-wire measurement of the backup battery voltage between P+ and P−, an existing coding resistor (recognition of the battery type) and temperature sensor with thermistor T can be read via the same measurement lines, which is inexpensive to implement.

Overall, the example shows how overvoltage protection for a backup battery can be provided by the invention.

The invention claimed is:

1. A control unit circuit for a motor vehicle, wherein the control unit circuit comprises a control unit for providing a vehicle function and, outside a housing of the control unit, an electrical energy store for an emergency supply of the control unit, wherein the energy store is set up to supply the control unit with electrical energy if there is no supply current from an on-board electrical system of the motor vehicle, wherein, to form a circuit for the emergency supply, two electrical poles of the energy store are connected to the control unit via a cable and, in the control unit or in the energy store or on the cable, one of the two electrical poles is connected via a switching element to a ground potential of the on-board electrical system and at least one measurement circuit couples each one of the poles to the ground potential and is set up to generate a measurement signal, which is correlated with a voltage dropped between the respective pole and the ground potential, and a control circuit of the switching element is set up to keep the switching element in an electrically conductive state in normal operation of the control unit and, at least in an event that the respective measurement signal of the at least one measurement circuit indicates that the respective voltage is greater than a predetermined threshold value, to switch the switching element to an electrically non-conductive state and thus to suppress an electrical coupling, brought about by the electrical switching element, between the control unit circuit and ground potential.

2. The control unit circuit as claimed in claim 1, wherein the control circuit has a signal input for receiving a switching signal and is set up to switch the switching element to an electrically non-conductive state depending on the switching signal.

3. The control unit circuit as claimed in claim 2, wherein the control unit is set up to carry out a test routine for checking an insulation resistance of the cable and/or a load test for the energy store and, at a beginning of the test routine and/or the load test, and generate the switching signal at the signal input.

4. The control unit circuit as claimed in claim 3, wherein, during the load test, an electric current of the energy store is routed via a load resistor connected between the poles of the energy store and the switching element is kept in the electrically non-conductive state by means of the switching signal and a respective voltage of both poles of the energy store with respect to the ground potential of the cable is set to a positive value by virtue of one of the poles or a supply line of the cable being connected to a charging circuit of the control unit circuit.

5. The control unit circuit as claimed in claim 1, wherein the at least one measurement circuit comprises in each case a series circuit composed of a Zener diode and a resistance element, via which the respective pole is connected to the ground potential, wherein the threshold value is stipulated by a breakdown voltage of the Zener diode.

6. The control unit circuit as claimed in claim 5, wherein the Zener diode is arranged on a pole side and the resistance element is arranged on a ground potential side in the series circuit.

7. The control unit circuit as claimed in claim 1, wherein each measurement circuit between the respective pole and the ground potential has a resistance value of more than 1 kiloohm.

8. The control unit circuit as claimed in claim 1, wherein the switching element is an N-channel MOSFET whose source electrode is connected to the ground potential, and the control circuit provides a connection of a gate electrode of the N-channel MOSFET to a positive voltage of the control unit and/or of the energy store via a pull-up resistor and the respective measurement circuit is connected to a control input of a respective switching transistor, which connects the gate electrode to the ground potential.

9. The control unit circuit as claimed in claim 8, wherein at least one further switching transistor connects the gate electrode to the ground potential.

10. The control unit circuit as claimed in claim 1, wherein a measurement circuit is provided for each of the two poles.

11. The control unit circuit as claimed in claim 10, wherein the measurement circuits provide different resistance values between the respective pole and the ground potential.

12. The control unit circuit as claimed in claim 1, wherein the cable comprises supply lines, which each connect one of the poles to the control unit, and through the cable for one or both of the poles a respective measurement line is additionally provided for connecting the pole to the control unit while bypassing the supply lines and the control unit is set up to detect a voltage of the pole and/or a thermistor on the energy store via the at least one measurement line.

13. The control unit circuit as claimed in claim 1, wherein the control unit provides an e-call emergency call function as the vehicle function.

14. A motor vehicle comprising a control unit circuit as claimed in claim 1.

15. A method for operating a control unit circuit, which provides a control unit for providing a vehicle function and, outside a housing of the control unit, an electrical energy store for an emergency supply of the control unit, wherein the energy store supplies the control unit with electrical energy if there is no supply current from an on-board electrical system of a motor vehicle, wherein two electrical poles of the energy store are connected to the control unit via a cable and one of the two electrical poles is connected via a switching element to a ground potential of the on-board electrical system and at least one measurement circuit couples each one of the poles to the ground potential and generates a measurement signal, which is correlated with a voltage dropped between the respective pole and the ground potential, and a control circuit of the switching element keeps the switching element in an electrically conductive state in normal operation of the control unit and, at least in an event that the respective measurement signal of the at least one measurement circuit indicates that the respective voltage is greater than a predetermined threshold value, switches the switching element to an electrically non-conductive state and thus interrupts an electrical coupling to the ground potential.

\* \* \* \* \*